US010563788B2

(12) United States Patent
Fluehs et al.

(10) Patent No.: US 10,563,788 B2
(45) Date of Patent: Feb. 18, 2020

(54) ELECTROMAGNETIC VALVE

(71) Applicant: KENDRION (Villingen) GmbH, Villingen-Schwenningen (DE)

(72) Inventors: Joachim Fluehs, Villingen-Schwenningen (DE); Holger Brandenburg, Villingen-Schwenningen (DE); Bjoern Bergfeld, Balingen-Endingen (DE); Frank Zelano, St. Georgen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 0 days.

(21) Appl. No.: 15/289,484

(22) Filed: Oct. 10, 2016

(65) Prior Publication Data
US 2017/0130859 A1 May 11, 2017

(30) Foreign Application Priority Data

Oct. 23, 2015 (DE) .......................... 10 2015 118 090

(51) Int. Cl.
F16K 31/06 (2006.01)
F02M 63/00 (2006.01)

(52) U.S. Cl.
CPC ..... F16K 31/0665 (2013.01); F02M 63/0017 (2013.01); F02M 63/0078 (2013.01)

(58) Field of Classification Search
CPC ............ F16K 31/0665; F02M 63/0078; F02M 63/0017
USPC ........................................ 251/129.15, 129.19
See application file for complete search history.

(56) References Cited

U.S. PATENT DOCUMENTS

| 3,529,805 A | | 9/1970 | Callahan, Jr. et al. |
| 4,597,558 A | * | 7/1986 | Hafner ................. F02M 51/066 239/585.1 |
| 5,087,016 A | * | 2/1992 | Advenier ............. F02M 59/466 251/129.15 |
| 7,036,788 B1 | * | 5/2006 | Schneider ........... F16K 31/0693 251/122 |

(Continued)

FOREIGN PATENT DOCUMENTS

| DE | 12 86 357 A | 1/1969 |
| DE | 2052307 A1 | 5/1972 |
| DE | 34 27 526 A1 | 2/1986 |

(Continued)

OTHER PUBLICATIONS

EPO Search Report for related application 16192556.5 dated Mar. 3, 2017.

(Continued)

Primary Examiner — Ian G Paquette
(74) Attorney, Agent, or Firm — William Gray Mitchell

(57) ABSTRACT

The invention is an electromagnetic valve, comprising
at least one valve seat arranged between at least one inlet channel and at least one outlet channel,
a sealing element by which the valve seat can be closed, and
an actuating element by which the sealing element can be moved in order to close the valve seat, with
the actuating element comprising at its end pointing to the sealing element a cup-shaped seat, with a support element being arranged in said cup-shaped seat, and
a sealing element that is connected fixed to the support element.

14 Claims, 3 Drawing Sheets

(56) References Cited

U.S. PATENT DOCUMENTS 7,789,373 B2 * 9/2010 Schulz .................... F16K 1/36
                                                                                                          251/121
2017/0307101 A1 * 10/2017 Ambrosi ............ F16K 31/0696

FOREIGN PATENT DOCUMENTS

| DE | 3427526 A1 | 2/1986 |
| DE | 199 17 756 A1 | 1/2000 |
| DE | 19917756 A1 | 1/2000 |
| FR | 1 123 507 A | 9/1956 |
| JP | S58 131353 A | 8/1983 |

OTHER PUBLICATIONS

GPTO office action for related application 10 2015 118 090.1 dated Aug. 31, 2016.

* cited by examiner

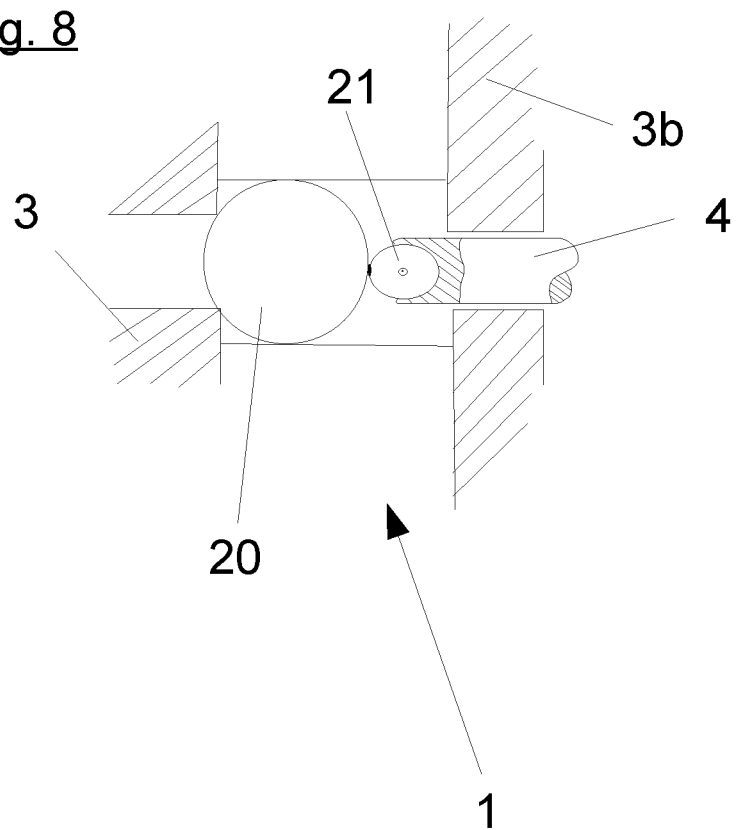

ELECTROMAGNETIC VALVE

CROSS REFERENCE TO RELATED APPLICATIONS

This patent application claims priority to German Patent Application 10 2015 118 090.1, filed on Oct. 23, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an electromagnetic valve.

Background of the Invention

Electromagnetic valves are known from prior art. Generally, such valves show an essentially cylindrical valve body, in which an exciter coil is wound onto a coil base and in which a rotor is arranged, upon electrification of the exciter coil displaceable along a first axis, preferably a central axis, in an axial penetrating opening of the coil base. During the axial displacement of the rotor a sealing element, arranged at the face of the rotor, is pressed into the valve seat or released therefrom.

A valve generally comprises at least one connection for an inlet, also called inlet channel, and at least one connection for an outlet, also called outlet channel. The sealing element can be switched into various positions, at least an opened position, in which the sealing element is not sealing a connection, and a closed position, in which the sealing element seals a connection.

In fluid technology electromagnetic valves are frequently used as directional control valves in order to release a path of an operating medium, e. g. compressed air or hydraulic fluid, to block it, or to change the direction of flow. A directional control valve is determined by the number of existing connections and switch positions. In directional control valves the first number represents the number of connections, while the second number represents the number of switch positions, e. g. 3/2-directional control valves comprise three connections, generally a P-connection (pump), a T-connection (tank), and an A-connection (operating cylinder), and two switch positions, generally "open" or "closed".

Such valves are known for example from EP 0 684 418 B1 and DE 198 34 786 C2.

In valves known from prior art the sealing element in the valve seat is arranged either loosely or connected fixed to the rotor via a tappet such that the sealing element is mandatory guided by the rotor. It has shown that loose sealing elements cannot completely follow an axial motion of the rotor, the so-called stroke, so that the valve cannot open or close completely. In sealing elements arranged connected fixed to the rotor here misalignments between the axis and the valve seat may lead, under certain circumstances, to the sealing element not completely reaching its seat and thus leakage can occur.

This problem shall be attained with the present invention.

The invention is based on the objective to provide an electromagnetic valve in which the sealing behavior of an electromagnetic valve is improved.

The objective is attained according to the invention in an electromagnetic valve with the features of claim 1.

Advantageous embodiments and further developments of the invention are disclosed in the dependent claims.

BRIEF SUMMARY OF THE INVENTION

In a preferred embodiment, an electromagnetic valve (1) comprising
at least one valve seat (3) arranged between at least one inlet channel (5) and at least one outlet channel (6),
a sealing element (20) by which the valve seat (3) can be closed, and
an actuating element (4) by which the sealing element (20) can be moved to close the valve seat (3), characterized in that
the actuating element (4) comprises a seat (4a) at its end (4a) pointing to the sealing element (20),
a support element (21) is arranged in the seat (4a), and
the sealing element (20) is connected fixed to the support element (21).

The electromagnetic valve (1) as described herein, characterized in that the support element (21) and/or the sealing element (20) are spherical.

The electromagnetic valve (1) as described herein, characterized in that the actuating element (4) is mobile along a first axis (A) extending through the inlet channel (5).

The electromagnetic valve (1) as described herein, characterized in that the support element (21) is arranged rotationally about a center (M) of the support element (21).

The electromagnetic valve (1) as described herein, characterized in that the actuating element (4) comprises a tappet (30).

The electromagnetic valve (1) as described herein, characterized in that the actuating element (4) comprises an injection molded coating (32) at its end (4a) pointing to the sealing element (20).

The electromagnetic valve (1) as described herein, characterized in that a projection (31) of the tappet (30) is surrounded by an injection molded coating (32).

The electromagnetic valve (1) as described herein, characterized in that the injection molded coating (32) comprises a socket (23) at the end (4a) pointing to the sealing element (20).

The electromagnetic valve (1) as described herein, characterized in that the support element (21) is injected into the injection molded coating (32).

The electromagnetic valve (1) as described herein, characterized in that the sealing element (20) is axially fixed at the support element (21) along a first axis (A) extending through the inlet channel (5).

The electromagnetic valve (1) as described herein, characterized in that the sealing element (20) is welded at a junction site (22) to the support element (21).

The electromagnetic valve (1) as described herein, characterized in that the sealing element (20) is radially mobile in reference to the first axis (A).

The electromagnetic valve (1) as described herein, characterized in that the sealing element (20) is pivotal about a center (M) of the support element (21).

The electromagnetic valve (1) as described herein, characterized in that the end (4a) of the actuating element (4) and/or an injection molded coating (32) is embodied at the end (4a) in a suitable fashion such that they limit a pivotal angle (a) during a pivotal motion of the sealing element (20) about a center (M) of the support element (21).

The electromagnetic valve (1) as described herein, characterized in that the electromagnetic valve (1) comprises a ball cage (3a) for guiding the sealing element (20).

BRIEF DESCRIPTION OF THE DRAWINGS

FIG. 8 is a line drawing evidencing a cross-section of another exemplary embodiment of an electromagnetic valve according to the invention.

DETAILED DESCRIPTION OF THE INVENTION

Figure 1:
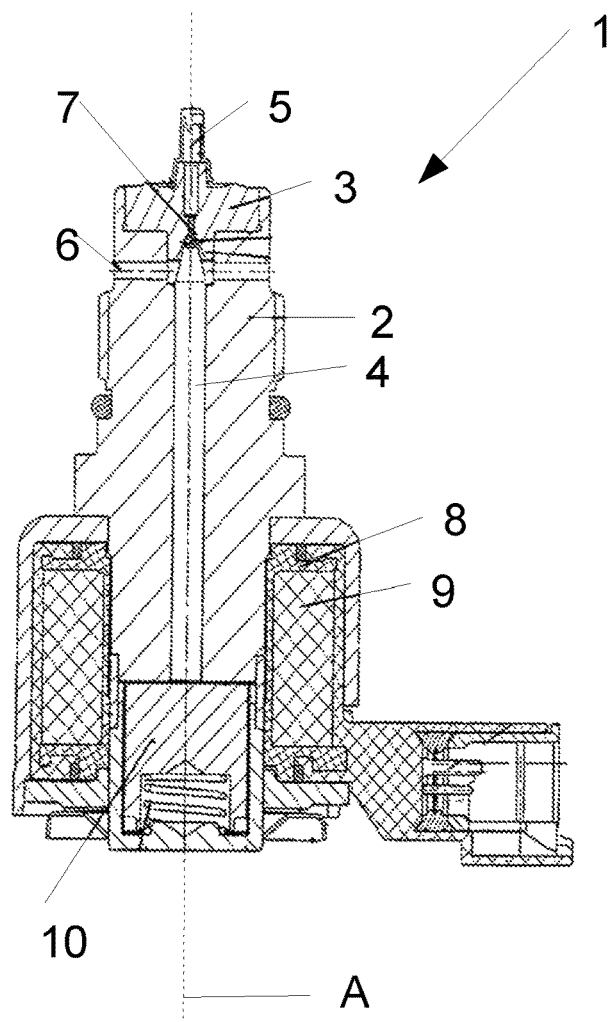
FIG. 1 is a line drawing evidencing a cross-section of an exemplary embodiment of an electromagnetic valve according to the invention.

The electromagnetic valve according to the invention comprises at least one valve seat, which is arranged between at least one inlet channel and at least one outlet channel, a sealing element by which the valve seat can be closed, and an actuating element by which the sealing element can be moved in order to close the valve seat. It is essential for the invention that the actuating element comprises a seat at its end pointing towards the sealing element, a support element is arranged in the seat, and the sealing element is connected fixed to the support element. The support element can here be arranged advantageously with almost no play on the axis. Such an arrangement of the support element can almost completely compensate misalignments between the axis and the valve seat.

According to a preferred embodiment of the invention the support element and/or the sealing element represent spheres. The advantage of a sphere acting as the sealing element is its arbitrary position when sealing at the valve seat, high precision, and good surface quality. The sphere can advantageously be cured and thus be almost free from wear and tear.

Advantageously the actuating element is mobile along a first axis extending through the inlet channel. By an axial motion the sealing element can be moved particularly easily between different switch positions.

The support element is advantageously supported rotationally around a center of the support element. This way the support element can particularly be rotated about the center in any direction.

According to another embodiment of the invention the actuating element may comprise a tappet. The support element is here arranged at said tappet. The tappet is preferably produced from steel or a synthetic material.

In a further development of the invention the actuating element comprises an injection molded coating at its end facing the sealing element. The injection molded coating is here embodied such that the support element is arranged with free play in the injection molded coating. For example, the injection molded coating may be a synthetic injection molded coating.

Advantageously a projection of the tappet is covered by an injection molded coating. The injection molded coating can engage this projection and this way be connected to the tappet.

The injection molded coating comprises preferably a socket at the end of the actuating element pointing towards the sealing element. The support element can easily be arranged in the socket.

In order to save components, the socket can advantageously also be directly generated by an appropriate injection of the support element into the injection molded coating.

If the tappet is made from plastic, the injection molded coating and the socket can also be integrated in the tappet.

According to a preferred embodiment of the invention the sealing element is axially fixed at the support element along a first axis extending through the first channel. By the axial fixation the sealing element can essentially also follow completely the axial motion occurring due to flux forces.

Advantageously the sealing element is welded to the support element at a junction site. Due to the welded connection the sealing element is connected fixed to the support element and thus an axial motion of the support element can follow particularly well.

Preferably the sealing element is radially mobile in reference to the first axis. Here, radial motions can compensate misalignments.

Preferably the sealing element is pivotal about a center of the support element. By a pivotal motion about the center of the support element the sealing element can be moved particularly easily in a radial direction in reference to the first axis.

In a further development of the invention the end of the actuating element and/or an injection molded coating at the end pointing to the sealing element are embodied suitable to limit a pivotal angle during a pivotal motion of the sealing element about a center of the support element. Typically a pivotal angle up to 10° is sufficient to compensate any misalignments.

In another advantageous embodiment of the invention the electromagnetic valve shows a ball cage for guiding the sealing element. The ball cage is particularly embodied such that the sealing element can be guided in the ball cage centrally. By a radially mobile connection to the actuating element the sealing element can be connected axially to the actuating element with little or no play, even in case of a central offset between the ball cage and the actuating element.

DETAILED DESCRIPTION OF THE FIGURES

FIG. 1 shows an electromagnetic valve 1 as a 2/2 directional control valve with a cylindrical valve body 2. A coil 9 is arranged wound onto a coil base 8 inside the valve body 2. The coil base 8 comprises an axial penetrating opening, through which a rotor 10 can be displaced along a first axis A.

Upon electrification of the coil 9 an electromagnetic force is applied upon the rotor 10 such that it moves along the first axis A in the direction towards a valve seat 3. The electromagnetic valve 1 can particularly be embodied such that the electromagnetic valve 1 can block in a straight fashion under full electrification, in spite of differently strong forces at the valve seat 3 generated by different inlet pressures.

Figure 4:
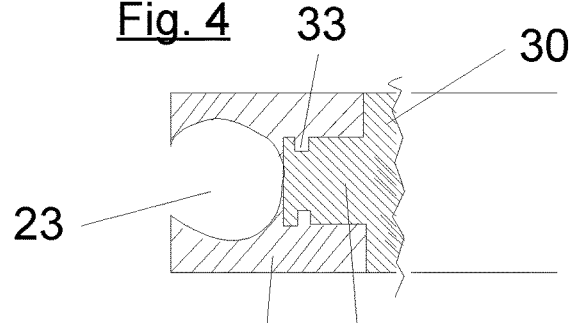
FIG. 4 is a line drawing evidencing another cross-section of an actuator element according to FIG. 2 without a support element.

An actuating element 4 is arranged at the rotor 10, which is embodied as a tappet 30 as shown for example in FIG. 4. The tappet 30 is made from steel. Alternatively the tappet 30 can also be made from a synthetic material.

Figure 2:
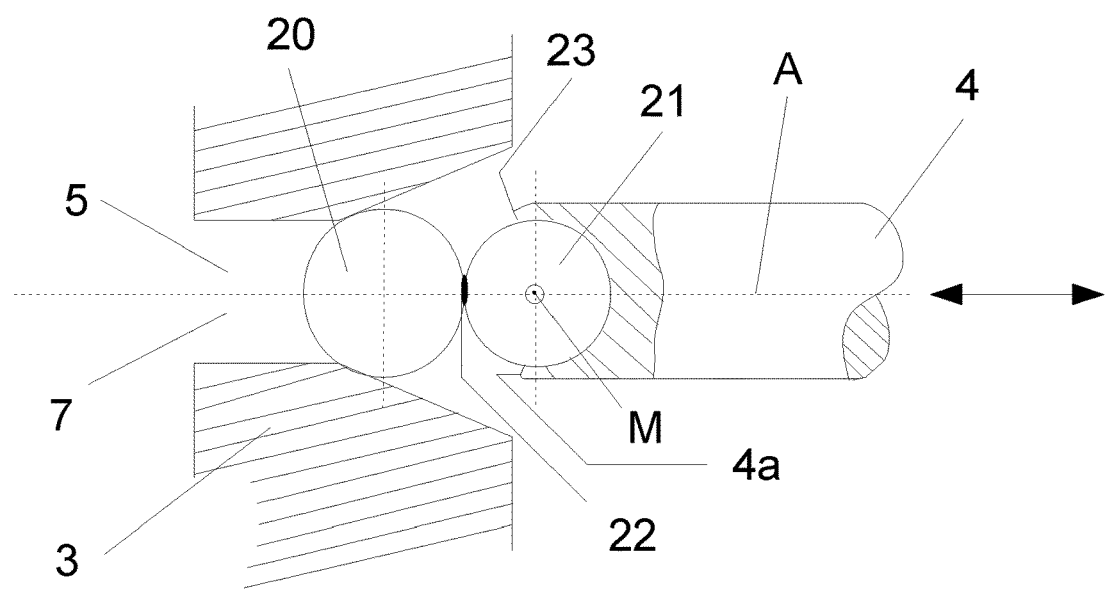
FIG. 2 is a line drawing evidencing an enlarged detail of an exemplary embodiment of a valve seat with an exemplary embodiment of an actuator element and a support element arranged in the actuator element.

The tappet 30 acts upon the support element 21, to which the sealing element 20 is connected fixed according to the invention, with the support element 21 being arranged at the end 4a of the actuating element 4 pointing towards the sealing element 20. FIGS. 1 to 8 show the bearing element 21 and the sealing element 20 respectively in the form of a sphere. A spherical sealing element is also called a valve ball. FIG. 2 shows the sealing element 20 welded to a junction site 22 of the support element 21, e. g. via capacitor-discharge welding.

Upon electrification of the coil 9 the sealing element 20 is pressed into a valve seat 3, 3a or pulled out of the valve seat 3, 3a due to an axial motion of the tappet 30. The electromagnetic valve 1 shown in FIG. 1 as a 2/2 directional control valve comprises, due to two potential connections namely an inlet channel 5 and an outlet channel 6 and two switch positions, a valve seat 2 shown in FIG. 2 in an enlarged detail. FIG. 8 shows an electromagnetic valve 1 embodied as 3/2 directional control valves. Due to the three potential connections and the two switch positions the electromagnetic valve of FIG. 8 shows another valve seat 3b, in addition to the valve seat 3.

Figure 3:
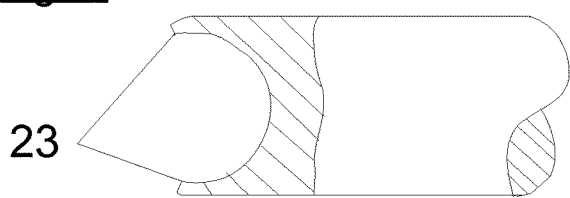
FIG. 3 is a line drawing evidencing a cross-section of the actuator element according to FIG. 2 without a support element.
Figure 5:
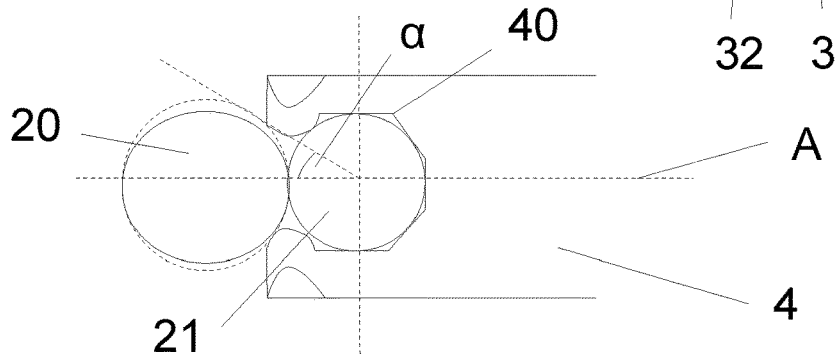
FIG. 5 is a line drawing evidencing a side view of another exemplary embodiment of an actuator element.

The support element 21 is arranged in a socket 23 of the actuating element 4. FIG. 3 shows a socket 23, in which the support element 21 can be clipped. It is also possible to flange or caulk the support element 21 to the socket 23. The support element 21 can be guided in the socket 23 like a ball of a ball-point pen. Further, the support element 21 may also be arranged in a blind bore 40 or in a cup-shaped seat of the actuating element 4, as shown in FIG. 5. The support element 21 is pivotal in any direction about a center M, i.e. the support element 21 is arranged almost without any play in the socket 23.

Figure 6:
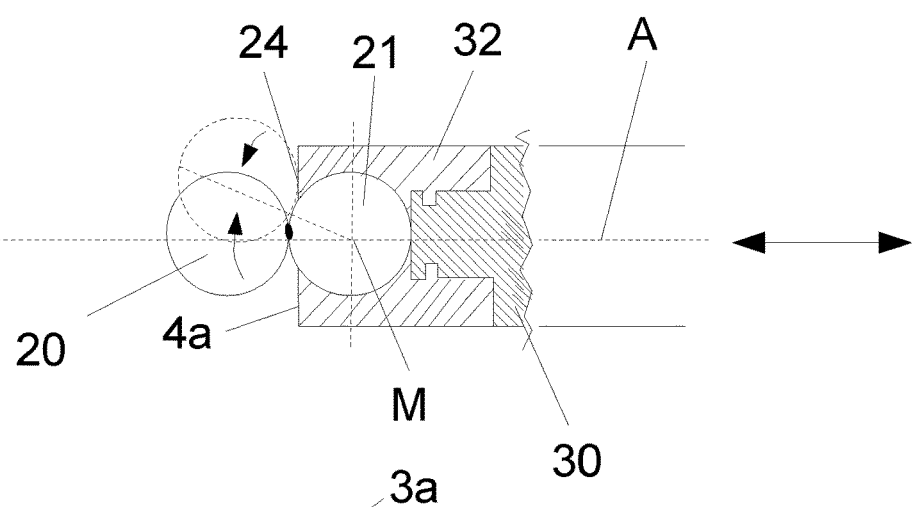
FIG. 6 is a line drawing evidencing a cross-section of an actuator element according to FIG. 4 with a support element.

By the arrangement of the support element in the actuating element 4 almost without any play and the connection of the sealing element 20 via the junction site 22 to the support element 21 the sealing element 20 is pivotal about the center of the support element 21, as discernible from FIGS. 5 and 6. The support element 21 is here arranged in the actuating element 4 such that a pivotal angle α is limited in its amount. Preferably the pivotal angle α is essentially no greater than 10°.

The pivotal angle α can be limited either by the shape of the blind bore 40 or by an injection molded coating 32 of the tappet 30. For this purpose, the injection molded coating 32 shows a stop 24, at which the sealing element 20 abuts upon reaching a maximum pivotal angle α during a pivotal motion. The injection molded coating 32 represents an injection molded synthetic coating as shown for example in FIGS. 4, 6. The socket 23 is provided by the injection molded coating 32. The tappet 30 comprises a groove 33, with the injection molded coating 32 being able to engage in such that the injection molded coating 32 is connected to the tappet 30.

Figure 7:
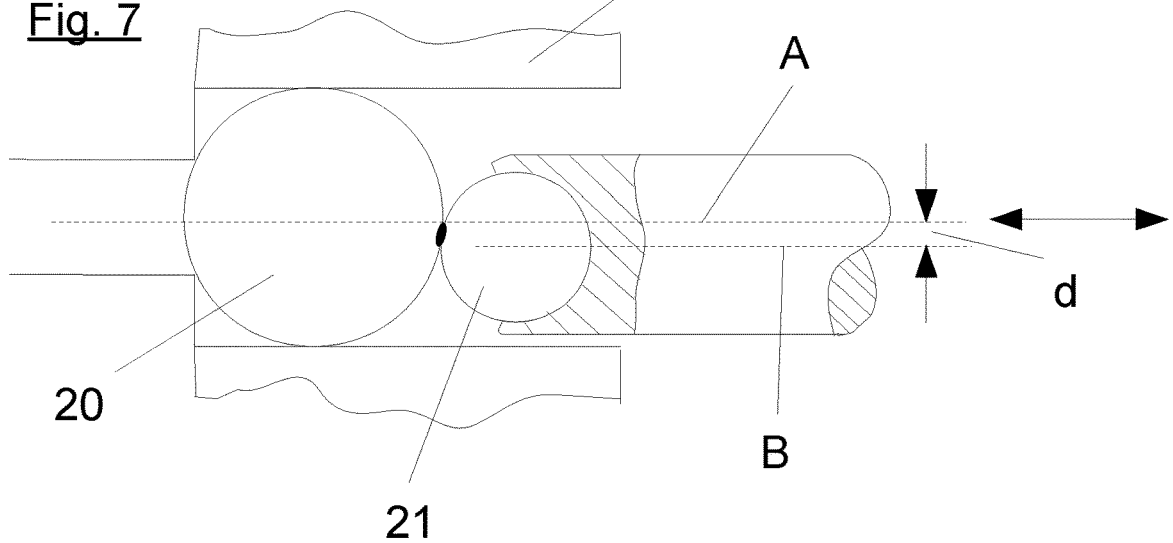
FIG. 7 is a line drawing evidencing a cross-section of the actuator element according to FIG. 2 with an exemplary embodiment of a ball cage.

In FIG. 7 the sealing element 20 is guided in a ball cage 3a in the valve seat 3, with the sealing element 20 being arranged centered in the ball cage 3a. Due to tolerances, a longitudinal axis B of the actuating element 4 may be arranged at a distance d and parallel in reference to a first axis A extending through the inlet channel 5. The distance d leads to a central offset between the support element 21 and the sealing element 20. By the radially mobile connection the sealing element 20 can be connected to the actuating element 4 with little or no play in spite of a central offset of the ball cage and the actuating element 4.

LIST OF REFERENCE NUMBERS

1 Electromagnetic valve
2 Valve body
3 Valve seat
3b Additional valve seat
3a Ball cage
4 Actuating element
4a End
5 Inlet channel
6 Outlet channel
8 Coil base
9 Coil
10 Rotor
20 Sealing element
21 Support element
22 Junction site
23 Socket
24 Stop
30 Tappet
31 Projection The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:
1. An electromagnetic valve comprising
at least one valve seat arranged between at least one inlet channel and at least one outlet channel,
a sealing element by which the valve seat can be closed, and
an actuating element by which the sealing element can be moved to close the valve seat, wherein
the actuating element comprises a seat at its end pointing to the sealing element,
a support element is arranged in the seat,
the support element and the sealing element are spherical, and
the sealing element is connected via a welded junction junction point fixed to the support element.
2. The electromagnetic valve according to claim 1, wherein the actuating element comprises a tappet.

3. The electromagnetic valve according to claim 1, wherein the sealing element is pivotal about a center of the support element.

4. The electromagnetic valve according to claim 1, wherein the end of the actuating element and/or an injection molded coating is embodied at the end in a suitable fashion such that they limit a pivotal angle during a pivotal motion of the sealing element about a center of the support element.

5. The electromagnetic valve according to claim 1, wherein the electromagnetic valve comprises a ball cage for guiding the sealing element.

6. The electromagnetic valve according to claim 1, wherein the actuating element is mobile along a first axis extending through the inlet channel.

7. The electromagnetic valve according to claim 6, wherein the support element is arranged rotationally about a center of the support element.

8. The electromagnetic valve according to claim 1, wherein the actuating element comprises an injection molded coating at its end pointing to the sealing element.

9. The electromagnetic valve according to claim 8, further comprising wherein a projection of the tappet is surrounded by an injection molded coating.

10. The electromagnetic valve according to claim 8, wherein the injection molded coating comprises a socket at the end pointing to the sealing element.

11. The electromagnetic valve according to claim 8, wherein the support element is injected into the injection molded coating.

12. The electromagnetic valve according to claim 9, wherein the sealing element is axially fixed at the support element along a first axis extending through the inlet channel.

13. The electromagnetic valve according to claim 12, wherein the sealing element is welded at a connection site to the support element.

14. The electromagnetic valve according to claim 12, wherein the sealing element is radially mobile in reference to the first axis.

* * * * *